United States Patent
Saginawa et al.

(10) Patent No.: US 12,277,248 B2
(45) Date of Patent: Apr. 15, 2025

(54) METHODS AND SYSTEMS FOR MANAGING USER DATA PRIVACY

(71) Applicant: DataGateway Inc., Tokyo (JP)

(72) Inventors: Kazuya Saginawa, Tokyo (JP); Tõnu Samuel, Räpina (EE); Jorge Quinteros, Santiago (CL); Saksham Kukreja, Dubai (AE); Yuet Fong, Hong Kong (HK)

(73) Assignee: DataGateway Inc., Tokyo (JP)

( * ) Notice: Subject to any disclaimer, the term of this patent is extended or adjusted under 35 U.S.C. 154(b) by 301 days.

(21) Appl. No.: 17/945,543

(22) Filed: Sep. 15, 2022

(65) Prior Publication Data

US 2023/0083642 A1 Mar. 16, 2023

Related U.S. Application Data

(60) Provisional application No. 63/244,815, filed on Sep. 16, 2021.

(51) Int. Cl.
*G06F 21/00* (2013.01)
*G06F 21/60* (2013.01)
*G06F 21/62* (2013.01)

(52) U.S. Cl.
CPC ........ *G06F 21/6245* (2013.01); *G06F 21/602* (2013.01); *G06F 2221/2111* (2013.01)

(58) Field of Classification Search
CPC ............... G06F 21/6245; G06F 21/602; G06F 2221/2111; G06F 21/64; H04L 63/0428; H04L 63/123
See application file for complete search history.

(56) References Cited

U.S. PATENT DOCUMENTS

| 11,003,791 B2* | 5/2021 | Wang ............... G16B 50/40 |
| 2012/0185921 A1* | 7/2012 | Wechsler ........... H04L 63/104 726/4 |

(Continued)

OTHER PUBLICATIONS

G. Zyskind, O. Nathan and A. '. Pentland, "Decentralizing Privacy: Using Blockchain to Protect Personal Data," 2015 IEEE Security and Privacy Workshops, San Jose, CA, USA, 2015, pp. 180-184, doi: 10.1109/SPW.2015.27. (Year: 2015).*

(Continued)

*Primary Examiner* — Ka Shan Choy
(74) *Attorney, Agent, or Firm* — Osha Bergman Watanabe & Burton LLP

(57) ABSTRACT

A method may include storing, using a data management application on a user device, personal data that is associated with a user and a first data variable. The method may further include obtaining, from a requesting application and by the data management application, a data request for a second data variable. The method may further include determining, by the data management application, whether the first data variable associated with the personal data matches the second data variable associated with the data request. The method may further include transmitting, by the data management application and in response to determining that the first data variable matches the second data variable, the personal data to various intermediary nodes. One intermediary node among the intermediary nodes may transmit the personal data to the requesting application using a distributed ledger.

14 Claims, 7 Drawing Sheets

(56) References Cited

U.S. PATENT DOCUMENTS

| | | | |
|---|---|---|---|
| 2019/0236300 A1* | 8/2019 | Guo | H04L 9/0869 |
| 2020/0084046 A1 | 3/2020 | Bessonov et al. | |
| 2021/0334769 A1* | 10/2021 | Kress | G06Q 20/3827 |
| 2024/0370577 A1* | 11/2024 | Jarvis | G06F 21/6245 |

OTHER PUBLICATIONS

Extended European Search Report issued in corresponding European Patent Application No. EP 22195721.0 dated Feb. 1, 2023 (7 pages).

Ballon, Ian C., "Mobile and Internet Contract Formation and Enforcement," E-Commerce and Internet Law: Legal Tratise with Forms, 2nd Edition, Chapter 21, Thomson/West Publishing, updated Apr. 2020 (133 pages).

Bitar, Hadi, and Björn Jakobsson, "GDPR: Securing Personal Data in Compliance with new EU-Regulations," Luleå University of Technology, 2017 (71 pages).

"Guide on Good Data Protection Practice in Research," European University Institute, Jul. 2021 (31 pages).

Groschopf, Wolfram, et al., "Smart Contracts for Sustainable Supply Chain Management: Conceptual Frameworks for Supply Chain Maturity Evaluation and Smart Contract Sustainability Assessment," Frontiers in Blockchain vol. 4, Article 506436, Apr. 2021 (22 pages).

Kamarinou, Dimitra, et al., "Machine Learning with Personal Data," Queen Mary University of London, School of Law, Available at SSRN: https://ssrn.com/abstract=2865811, Nov. 2016 (23 pages).

Korff, Douwe, "The Territorial (and Extra-Territorial) Application of the GDPR with Particular Attention to Groups of Companies Including Non-EU Companies and to Companies and Groups of Companies that Offer Software-as-a-Service," Available at SSRN: https://ssrn.com/abstract=3439293, Aug. 2019 (57 pages).

Matzutt, Roman, et al., "Poster: I Don't Want That Content! On the Risks of Exploiting Bitcoin's Blockchain as a Content Store," ACM SIGSAC Conference on Computer and Communications Security, Oct. 2016 (4 pages).

Matzutt, Roman, et al., "A Quantitative Analysis of the Impact of Arbitrary Blockchain Content on Bitcoin," Communication and Distributed Systems, RWTH Aachen University, and Data Protection Research Institute, Goethe University, 2018 (18 pages).

Mulligan, Stephen P., et al., "Data Protection Law: An Overview," Congressional Research Service, Mar. 25, 2019 (79 pages).

Nica, Octabian, et al., "Cryptocurrencies: Economic benefits and risks," University of Manchester, FinTech working paper No. 2, Oct. 26, 2017 (56 pages).

Pournaras, Evangelos, "Proof of Witness Presence: Blockchain Consensus for Augmented Democracy in Smart Cities," Elsevier, Jul. 8, 2020 (19 pages).

Pupillo, Lorenzo, et al., "Artificial Intelligence and Cybersecurity: Technology, Governance and Policy Challenges," CEPS Task Force Report, Center for European Policy Studies, May 2021 (122 pages).

Swan, Melanie, "Blockchain: Blueprint for a New Economy," O'Reilly Media, Inc., Feb. 2015 (149 pages).

Templin, Sarah, "Blocked-Chain: The Application of the Unauthorized Practice of Law to Smart Contracts," The Georgetown Journal of Legal Ethics, vol. 32, 2019 (17 pages).

Tseng, Cheng-Te, and Shari S. C. Shang, "Exploring the Sustainability of the Intermediary Role in Blockchain," Sustainability, 13(4), 2021 (21 pages).

Tsukerman, Misha, "The Block is Hot: A Survey of the State of Bitcoin Regulation and Suggestions for the Future," Berkeley Technology Law Journal, vol. 30, Issue 4, 2015 (44 pages).

Wachter, Sandra, et al., "Counterfactual Explanations Without Opening the Black Box: Automated Decisions and the GDPR," Harvard Journal of Law & Technology, vol. 31, No. 2, Spring 2018 (47 pages).

* cited by examiner

METHODS AND SYSTEMS FOR MANAGING USER DATA PRIVACY

CROSS-REFERENCE TO RELATED APPLICATIONS

This application claims priority to U.S. Provisional Patent Application Ser. No. 63/244,815, titled "METHODS AND SYSTEMS FOR MANAGING USER DATA PRIVACY," which was filed on Sep. 16, 2022, and is incorporated herein by reference.

BACKGROUND

Data accessibility is becoming major source of problems for users and companies. At a given moment, a particular user likely has huge quantities of personal data distributed among many central servers and organizations that are beyond the user's control. Where data privacy laws are being introduced to limit and protect users from the data misuse by third parties, data privacy laws may also sacrifice some of the benefits available to processing personal data for the benefit of the user. At the same time user data may not be available to interested parties even if the user would want to share such information, even sensitive personal data. Thus, technologies are desired that both protect user privacy as well as enable personal data to become more accessible for data processing operations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a system that includes various user devices that includes a particular user device. The user device includes a first hardware processor, a cryptographic key, and personal data associated with a user and a data variable. The system further includes a node coupled to the user devices and including a second hardware processor. The system further includes various intermediary nodes coupled to the user devices and the node. The intermediary nodes implement a distributed ledger. The node transmits a broadcast request to the user devices, where the broadcast request includes a data request associated with the data variable. The user device transmits, in response to receiving the broadcast request, encrypted data to the intermediary nodes based on the personal data and the cryptographic key. The intermediary nodes transmit the encrypted data to the node using the distributed ledger.

In general, in one aspect, embodiments relate to a method that includes storing, using a data management application on a user device, personal data that is associated with a user and a first data variable. The method further includes obtaining, from a requesting application and by the data management application, a data request for a second data variable. The method further includes determining, by the data management application, whether the first data variable associated with the personal data matches the second data variable associated with the data request. The method further includes transmitting, by the data management application and in response to determining that the first data variable matches the second data variable, the personal data to various intermediary nodes. One intermediary node among the intermediary nodes transmits the personal data to the requesting application using a distributed ledger.

In general, in one aspect, embodiments relate to a method that includes transmitting, by a node that includes a hardware processor, a broadcast request to various user devices on a publisher-subscriber network. The broadcast request includes a data request regarding a data variable. The method further includes obtaining, by the node and in response to the broadcast request, personal data from various intermediary nodes coupled to the publisher-subscriber network. The node is a publishing node and the user devices are subscriber nodes. The intermediary nodes implement a distributed ledger. The intermediary nodes transmit the personal data to the node in response to the intermediary nodes validating a data transaction associated with the personal data using the distributed ledger.

In general, in one aspect, embodiments relate to a user device that includes a hardware processor, a cryptographic key, and a data management application that stores personal data associated with a user and a data variable. The user device receives a broadcast request from a node. The broadcast request includes a data request associated with the data variable. The user device transmits, in response to receiving the broadcast request and determining that the data request matches the personal data, encrypted data to various intermediary nodes based on the personal data and the cryptographic key.

In general, in one aspect, embodiments relate to a node that includes a hardware processor, a requesting application, and a cryptographic key. The node transmits a broadcast request to various user devices, where the broadcast request includes a data request associated with a data variable. The node receives, in response to transmitting the broadcast request, encrypted data from various intermediary nodes. The encrypted data includes personal data that is decrypted using the cryptographic key.

In general, in one aspect, embodiments relate to an intermediary node that includes a hardware processor, such as a computer processor, and a distributed ledger. The intermediary node receives encrypted data from a user device. The intermediary node further transmits the encrypted data to a requesting application on a node in response to validating various data transactions associated with the encrypted data and using the distributed ledger.

In some embodiments, a user device is coupled to various intermediary nodes and the user device includes a data management application. The data management application may store personal data associated with a data variable and a predefined response associated with the data variable. The data management application may transmit the personal data to the intermediary nodes automatically in response to a data request associated with the data variable and based on the predefined response.

In some embodiments, a user device is coupled to various intermediary nodes and the user device includes a data management application. The data management application may store personal data and various predefined responses associated with various data variables. The data management application may obtain a data request associated with a data variable. The data management application may determine whether the data request corresponding to the data variable matches at least one data variable associated with at least one predefined response among the predefined responses. The data management application may present, in response to the data request failing to match a data variable among the predefined requests, a notification on a display device requesting authorization to transmit the second personal data. In some embodiments, a publisher-subscriber network includes various user devices and a node. The user devices may be subscriber nodes within the publisher-subscriber network. The node may be a publishing node within the publisher-subscriber network. The node may use a publisher-subscriber network protocol to transmit a broadcast request over the publisher-subscriber network. In some embodiments, the data management application is a decentralized application (DApp).

In some embodiments, various intermediary nodes are blockchain nodes. The blockchain nodes may validate various data transactions that include a first data transaction and a second data transaction. The first data transaction may correspond to a user device transmitting encrypted data to the blockchain nodes. The second data transaction may correspond to the blockchain nodes transmitting the encrypted data to a node. In some embodiments, a distributed ledger includes a smart contract. A respective intermediary node among various intermediary nodes may execute the smart contract in response to receiving encrypted data from a user device. The respective intermediary node may relay the encrypted data to the node based on a location address that is stored in the smart contract. In some embodiments, a distributed ledger is a private blockchain, a public blockchain, a hybrid blockchain, a hashgraph, or a directed acyclic graph. In some embodiments, a data variable corresponds to a user's gender, a user's sexual orientation, a user's ethnic origin, and/or a user's political affiliation. In some embodiments, a data request is part of a broadcast request that is transmitted over a publisher-subscriber network using a publisher-subscriber network protocol. A user device may be a subscriber node, and a requesting application may be located on a server that is a publishing node.

In some embodiments, various intermediary nodes validate, using a distributed ledger, a first data transaction. The intermediary nodes may also validate, using the distributed ledger, a second data transaction. The first data transaction may correspond to the user device transmitting the personal data to the intermediary nodes. The second data transaction may correspond to the intermediary nodes transmitting the personal data to a requesting application. In some embodiments, a distributed ledger includes various user accounts. The first data transaction may include determining whether a data management application is authorized to transmit personal data associated with a first user account in the distributed ledger. In some embodiments, a data transaction is validated by determining whether a requesting application is authorized to receive personal data from various intermediary nodes or receive personal data associated with a particular data management application or user. In some embodiments, personal data is validated as being from a user using a decentralized identity (DID). In some embodiments, encrypted data is decrypted using a public cryptographic key to produce decrypted data. The decrypted data may correspond to personal data that is obtained by a node. In some embodiments, a distributed ledger includes a smart contract. A respective intermediary node among various intermediary nodes may execute the smart contract in response to receiving personal data. The respective intermediary node may relay the personal data to the node based on a location address that is stored in the smart contract. In some embodiments, a data transaction is validated by determining whether a requesting application on a node is authorized to receive personal data from various intermediary nodes. In some embodiments, a node is a user device.

In light of the structure and functions described above, embodiments disclosed herein may include respective means adapted to carry out various steps and functions defined above in accordance with one or more aspects and any one of the embodiments of one or more aspect described herein.

Other aspects of the disclosure will be apparent from the following description and the appended claims.

DETAILED DESCRIPTION

Figure 1A:
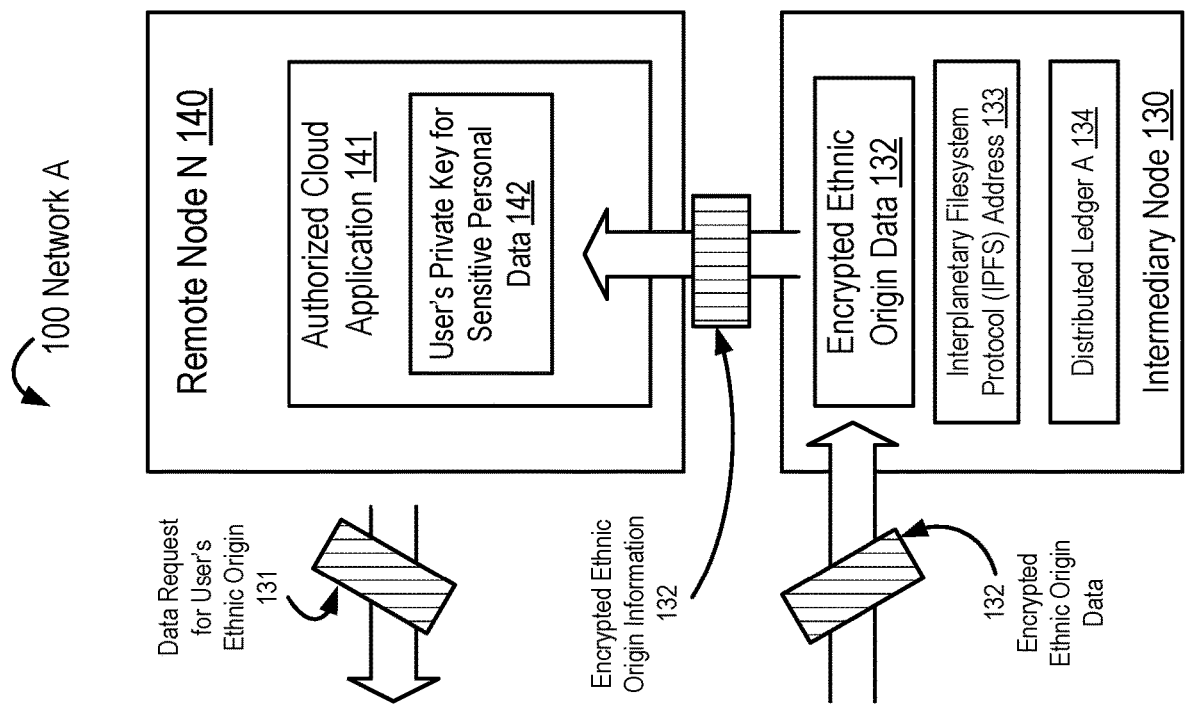
FIGS. 1A and 1B show systems in accordance with one or more embodiments.
Figure 1A:
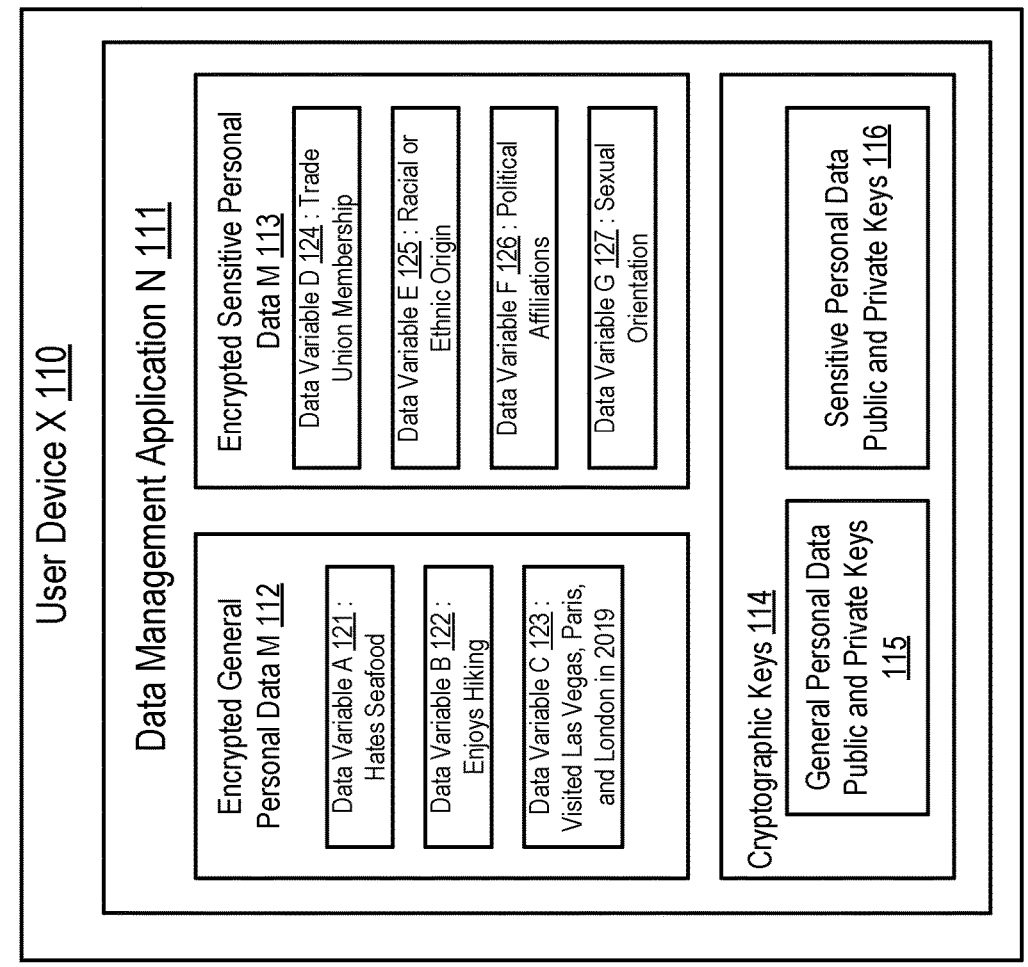

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments are directed to systems and methods for managing a user's personal data. In some embodiments, for example, a user device includes a data management application (also called a "data wallet") that administers the storage, processing, and/or transfer of personal data to third parties using various technologies, such as cryptographic keys. For example, user data inside a data wallet may be unencrypted in order to compare the user data against various incoming requests. On the other hand, if the user data is encrypted on a user device, a data management application may possess or have access to a cryptographic key for accessing the user data. Thus, some embodiments use unencrypted user data, while other embodiments may use encrypted user data or both encrypted and unencrypted user data.

In some embodiments, the data management application may use one or more distributed ledger technologies for storing personal data as well as administering the personal data in various data transactions (e.g., using smart contracts) with third parties. More specifically, a data management application may provide a user with the ability to act as both a data processor and a data controller for his/her own personal data.

By doing so, various legal and regulatory hurdles may be overcome that are associated with data processing and data usage by third parties. Where centralized servers are often responsible for cybersecurity breaches, unauthorized usages of personal data, and direct selling of personal data without a user's consent, the data management application may use various decentralized processing technologies to keep the possession of personal data with the human user and beyond the control of third parties. Examples of these decentralized processing technologies include using decentralized identifiers (DIDs), decentralized applications (DApps), distributed ledger technologies (such as blockchain nodes), and various cryptographic systems.

Furthermore, some embodiments operate multiple data management applications within a data privacy ecosystem (also called a "data marketplace"). In the data privacy ecosystem, data requests for personal data may be broadcast to various nodes (e.g., various user devices with respective data management applications) on a network. A data management application may determine whether a user's personal data matches the desired information related to the data request. Thus, processing these requests may be offloaded to a user's device and kept under the control of the user. While a publishing node may broadcast data requests to members of the data privacy ecosystem, the publishing node may have no actual knowledge of which subscriber nodes match actual data requests. Accordingly, a user can accept or reject the data request while maintaining anonymity within the network. Should a user accept a data request, the data management application may provide his/her personal data to the requesting entity through one or more privacy-protected channels implemented by the data management application. Likewise, more sophisticated data processing is also contemplated such as accepting smart contracts and performing other transactions in response to requests transmitted over the data privacy ecosystem.

Turning to FIG. 1A, a network (e.g., network A (100)) may include various user devices (e.g., user device X (110)) and various remote nodes (e.g., remote node N (140)). On the user device X (110), a user's data management application N (111) may store encrypted general personal data (e.g., encrypted general personal data M (112)) and/or encrypted sensitive personal data (e.g., encrypted sensitive personal data M (113)). Examples of general personal data may include personal interests (e.g., enjoys hiking and pizza), personal dislikes (e.g., hates seafood), location history (e.g., visited Las Vegas, Paris, and London in 2019) and other information, such as web browser history, employment history, social contacts such as friends and family, etc. Examples of sensitive personal data may include medical history and information, racial and ethnic origin, political affiliation, sexual orientation, gender information, etc. For example, sensitive personal data may correspond to the definition of sensitive personal data provided by the General Data Protection Regulation (GDPR) (e.g., trade union membership, genetic data, biometric data, etc.). Likewise, sensitive personal data may also be determined based on governmental and other regulatory entities associated with a user's location. On the other hand, sensitive personal data may also be designated by the user. A user device may also store various cryptographic keys (e.g., cryptographic keys (114), such as general personal data public and private keys (115) and sensitive personal data public and private keys (116)). A user's data management application may be an application that includes hardware and/or software with functionality for providing control over general personal data and sensitive person data on a user device. For example, a user's data management application may be implemented using one or more technologies described in below section titled COMPUTER SYSTEM.

In some embodiments, a user device communicates with one or more intermediary nodes (e.g., intermediary node (130)) to transfer personal data to a particular node. As shown in FIG. 1A, for example, a user device X (110) may transmit encrypted ethnic origin data (132) to an intermediary node (130). The encrypted information may be stored on the intermediary node prior to being relayed to the remote node N (140). The encrypted ethnic origin data (132) may also be transmitted in response to a data request (131) for such information by an authorized cloud application (141) on a remote node N (140). The authorized cloud application (141) may be a requesting application that includes hardware and/or software and has a user's private key (e.g., user's private key for sensitive personal data (142)) for decrypting sensitive personal data. On the other hand, the user's data may permanently reside on one or more intermediary nodes, and the user's data management application may merely transmit a request for the remote node to access the stored data. Intermediary nodes may also be used to transmit a request from a remote node N (140) to the user device X (110), e.g., to maintain anonymity on behalf of the user device.

In some embodiments, one or more intermediary nodes are implemented using distributed ledger technology (e.g., distributed ledger D (134) that is stored on intermediary node (130)). For more information on distributed ledger technology, see the section below titled DISTRIBUTED LEDGER TECHNOLOGY. While intermediary nodes are shown in FIG. 1A being used to transfer user data, other embodiments are also contemplated where user data is transmitted directly to a requesting node (e.g., using a protocol for peer-to-peer communication).

Keeping with FIG. 1A, a user may select which data is available in a user's data management application for processing data requests received from outside entities. For example, various legal requirements associated with data processing may be avoided where a user processes his own personal data. As such, a user's data management application may implement a zero-knowledge proof or zero-knowledge protocol where a user (i.e., the prover) can indicate answers based on personal data processing to any requesting entities (e.g., a verifying entity) without conveying any personal data beyond confirmation that the user's data management application contains the requested personal data. Thus, decision-making functionality may be performed in a user's data management application without enabling processing or control of the user's data by an external entity.

In some embodiments, a user's data management application includes a user interface that securely interacts with various peers and institutions in a way that maintains data integrity, validity, and/or confidentiality. For example, a data management application's interface may be implemented within a mobile application on a smartphone. In some embodiments, the user interface may be integrated as a separate interface on top of a web browser. For example, a private key of a user may be stored or made accessible through a mobile application, browser, or both. This user interface may be the point where data is decrypted for use. The data may be cached using metadata that is stored or associated with one or more data templates. In some embodiments, one or more data templates are used for transmitting user data and/or performing transactions. For example, a structured dataset can be used for efficient data processing. Thus, a data template may provide an agreed upon data structure for communicating user data between a data management application and one or more requesting applications. Furthermore, a user's data management application may include one or more application programmable interfaces (APIs) for communicating and/or authorizing transmission of personal data without a user's input. In some embodiments, the user interface provides a prompt to a user in response to a data request for personal data.

In some embodiments, a user's data management application may include functionality for sharing data with one or more recipients. For example, a user may select data variables or data fields (e.g., data variable A (121), data variable B (122), data variable C (123), data variable D (124), data variable E (125), data variable F (126), and data variable G (127)) across data structures in the user's data management application that the user wants to share with a particular recipient. In order to do so, the decrypted data on the user interface may be collected to create a new data file encoded with a transaction hash/ID (e.g., for a smart contract). The user may then authorize the decrypted data with his private key and encrypt it with the public key of the recipient. Once the data is signed and encrypted, it may be stored in one or more intermediary nodes that are assigned a location address (such as an interplanetary filesystem protocol (IPFS) address (133)).

In some embodiments, a user's data management application is part of a decentralized network that is used in connection to a decentralized identity. For example, a decentralized identity may be generated by verifying the user's actual identity. This may be done through an e-KYC mechanism to ensure that one person has one and only one identity in the ecosystem. KYC may refer to 'Know Your Customer' or 'Know Your Client', and some embodiments may include a process where a business verifies the identity of users to determine the legitimacy and credibility of personal data provided by the user. Once a user's account is verified through an e-KYC mechanism, a user's data management application may be allotted a pair of randomly generated private and public keys along with a user device's address. For any given key pair, a public key may be associated with a person that is generally made public to anyone who needs it within a network. A private key may be held only with the person himself/herself. Once someone encrypts data with the public key of a particular user, the encrypted data may only be decrypted by the user using the user's private key. Likewise, if a user encrypts some data with his private key, anyone in the network can decrypt the encrypted data using his public key and verify that the data has been sent by that particular user.

In some embodiments, one or more recovery processes are used to recover a private key based on a user's identity. For example, some users may not be trusted to hold on to their respective private key if only one private key is to be associated with an identity throughout the user's life. Thus, recovery processes may include: (1) split-key encryption; (2) a secure hardware environment; (3) a QR code mnemonic; (4) a physical key; and (5) multiple symmetric keys to decrypt and access private key (e.g., different keys may correspond to different friends, entities (e.g., social networking sites, restaurants, e-commerce sites), and special entities (police, hospitals, government organizations, etc.); and (6) threshold cryptography. For more information on encryption/decryption processes, and recovery processed, see the section below titled ENCRYPTION AND DECRYPTION TECHNOLOGIES.

In some embodiments, a user may issue a data transaction that can populate personal data according to one or more data templates. The data transaction may be executed by a user e.g., by signing with their private key for verification and/or to prove authority for the data transaction. Finally, personal data may be encrypted with a public key of the data's owner. Once the data is encrypted, the encrypted data may be stored on one or more intermediary nodes. The encrypted data may be later retrieved based on an IPFS address associated with the intermediary nodes. Thus, a data transaction may be entered on a main-chain or a sub-chain that has one or more of the following criteria: (1) a transaction hash/ID; (2) an ID of a data template; (3) an address of the issuer/data provider; (4) an address of the recipient/data owner; (5) an IPFS hash address for the data location; and (6) the data can only be decrypted by the data owner upon retrieval from the storage nodes.

In some embodiments, a data management application is used to share data with a smart contract that subsequently processes the shared data. The data may then be shared with a recipient on a "need-to-know" basis. The smart contract may receive data from the user (e.g., through "as-it-is" data share), decrypt the data at the smart contract's end, process the data to arrive at intended results and finally, share the processed data with the recipient. Here, two data transactions may be recorded using a distributed ledger technology, such as one data transaction from a user to the smart contract, and another data transaction from the smart contract to the recipient. The smart contract may again sign the processed data, encrypt the data with the public key of the recipient, store the data, and generate a location address for the data, and send the data over to the recipient. In some embodiments, a distributed ledger may include another field in the data transaction records, such as a final destination or an origin source to link the two data transactions that have occurred with the smart contract.

In some embodiments, every data point in a user's information is validated in order to prevent data manipulation when the data is shared with a recipient. This validation may be performed using a validation function or a validation smart contract that checks every data transaction corresponding to the data points, such as whether the person had the authority to issue the data transaction, the user is the actual recipient of the data, the data format is acceptable, and so on. Only after this validation is done, a data transaction for a data share may be reflected in a distributed ledger.

In some embodiments, various mechanisms are used to determine transaction acceptance. For example, a check may be used to confirm that there is no transaction spamming. In other words, data transactions may only be issued in a distributed ledger when both parties accept the issuance/data share.

In some embodiments, data watermarking is used to prevent data leaks. For example, data that is sent to the recipient can be watermarked in a way that if it is leaked, the source of the leak can be identified. Necessary action such as revocation of authority may be performed if such a situation is encountered.

In some embodiments, requests for data are received with constraints that are unknown to a data management application. For example, a data management application may not have information of a COVID-19 vaccination of user while an airline company is requesting proof of such test made within last 72 hours. If enabled, a data management application may access a public cloud for a respective data template. The data management application may then download requested data on behalf of the user together with digital signatures ensuring that the data can be used as a proof of the data's validity.

Figure 1B:
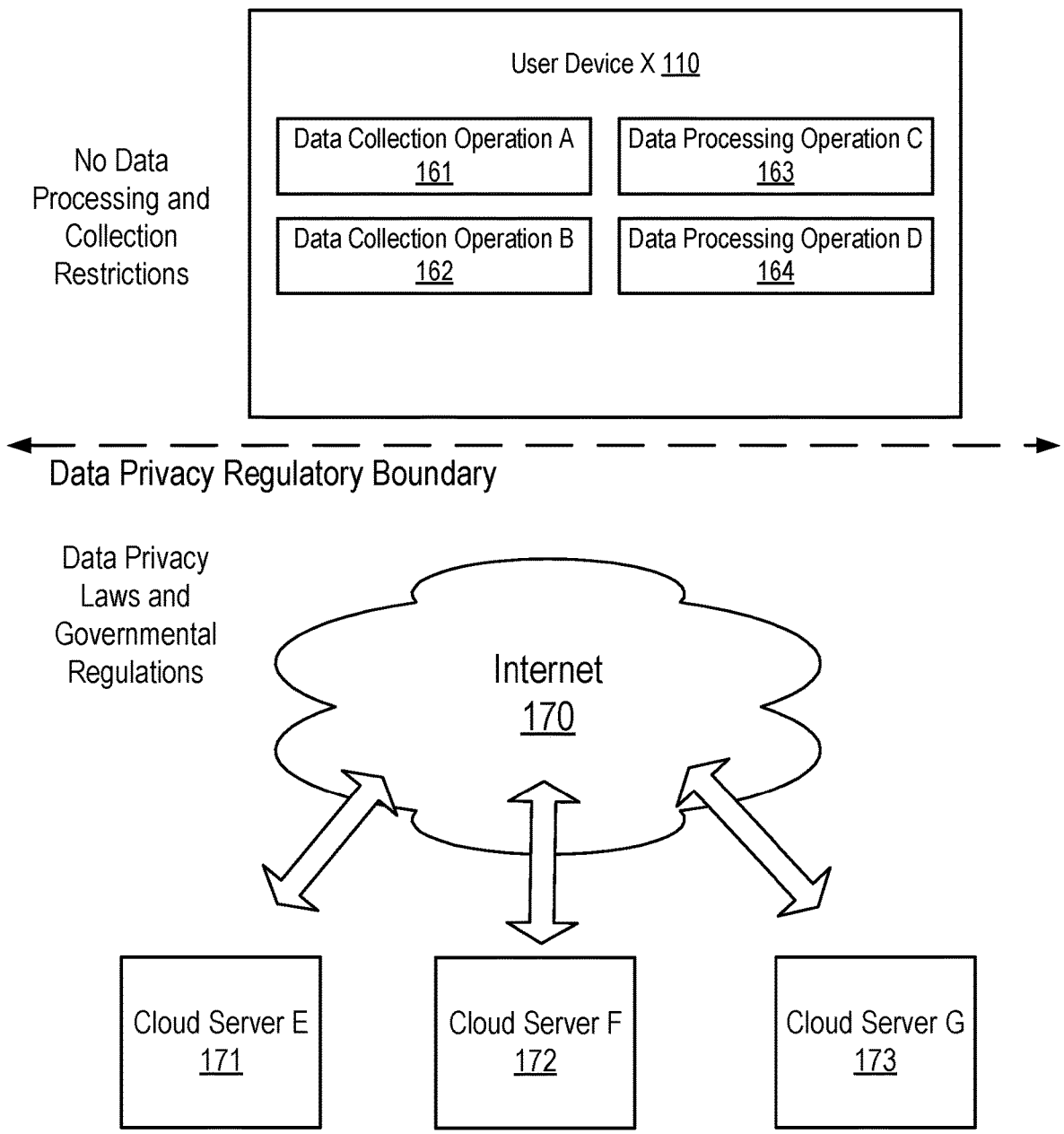

Turning to FIG. 1B, FIG. 1B illustrates a system in accordance with one or more embodiments. As shown in FIG. 1B, a data privacy regulatory boundary is shown that distinguishes between regulated data processing and unregulated data processing. For example, personal data processing performed by cloud server E (171), cloud server F (172), and cloud server G (173) may be subject to various data privacy laws and government regulations. For European residents and cloud servers located in European countries, for example, various privacy laws may place restrictions on how the personal data may be processed and for which purposes. As such, any data collection operation or data processing operation on this side of the regulatory boundary (e.g., within Internet (170)) may require explicit consent of a person associated with the personal data or that the data may be collected/processed for a legitimate purpose.

Keeping with FIG. 1B, various operations are performed by a data management application with the user device X (110) (e.g., data collection operation A (161), data collection operation B (162), data processing operation C (163), data processing operation D (164)). Where the cloud servers E, F, and G (171, 172, 173) are bound by various restrictions regarding usage of a user's personal data, the data management application may be unencumbered by data privacy laws and regulations when acting on behalf of the user. For example, a user may analyze personal data and forecast or predict model (e.g., using artificial intelligence and machine learning) using data collection and data processing actions under the control of the user. Thus, a user may have the opportunity to transform personal data, and control various outcomes of their personal data processing into valuable assets. Artificial intelligence may enable automated decision-making in domains that require complex choices, based on multiple factors and non-predefined criteria.

Figure 2:
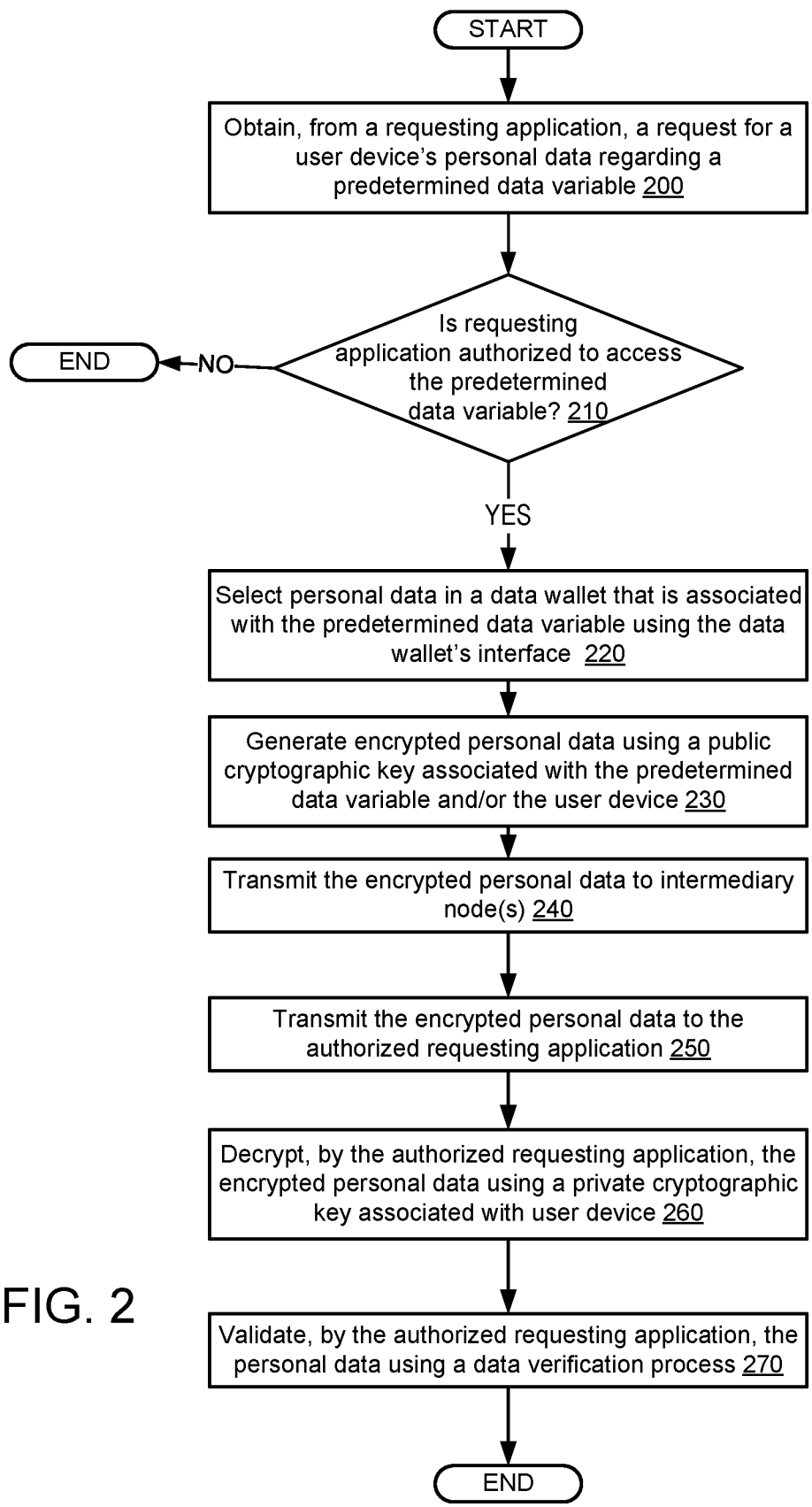
FIG. 2 shows a flowchart in accordance with one or more embodiments.

Turning to FIG. 2, FIG. 2 shows a flowchart in accordance with one or more embodiments. Specifically, FIG. 2 describes a general method for transmitting and/or processing user data in accordance with one or more embodiments. One or more blocks in FIG. 2 may be performed by one or more components (e.g., user's data management application N (111)) as described in FIGS. 1A and 1B. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, a request for a user device's personal data is obtained from a requesting application regarding a predetermined data variable in accordance with one or more embodiments. For example, the predetermined data variable may correspond to a user's gender, political affiliation, or medical history. Likewise, the predetermined data variable may be defined within a data template for communicating and/or storing user data within a decentralized system (such as using intermediary nodes or a distributed ledger technology). Thus, the data variable may correspond to one or more fields of a data transaction performed using a decentralized system or a DApp.

In Block 210, a determination is made whether a requesting application is authorized to access a predetermined data variable. For example, a requesting application may be authenticated based on signing the request using a cryptographic key. Thus, a user's data management application may determine whether the requesting application is authorized to receive any requested user data. If the requesting application is not authorized, the process in FIG. 2 may end. If the requesting application is authorized, the process may process to Block 220.

In Block 220, personal data is selected in a data management application that is associated with a predetermined data variable using a data management application's interface in accordance with one or more embodiments.

In Block 230, encrypted personal data is generated using a public cryptographic key associated with a predetermined data variable and/or a user device in accordance with one or more embodiments.

In Block 240, encrypted personal data is transmitted to one or more intermediary nodes in accordance with one or more embodiments. For example, the intermediary nodes may be similar to the intermediary nodes described above in FIG. 1A and the accompanying description. In some embodiments, Block 240 is optional. For example, data may be stored on a user device (e.g., a smartphone) or be stored elsewhere in an encrypted form, such as among one or more intermediary nodes.

In Block 250, encrypted personal data is transmitted to an authorized requesting application in accordance with one or more embodiments.

In Block 260, encrypted personal data is decrypted by an authorized requesting application using a private cryptographic key associated with a user device in accordance with one or more embodiments.

In Block 270, personal data is validated by an authorized requesting application using a data verification process in accordance with one or more embodiments. For example, the data verification process may be a consensus algorithm performed by a system using distributed ledger technology.

Depending on a particular use case, Block 260 or Block 270 may be the end of the process in FIG. 2, i.e., a process may not necessarily perform both Blocks 260 and 270.

Figure 3A:
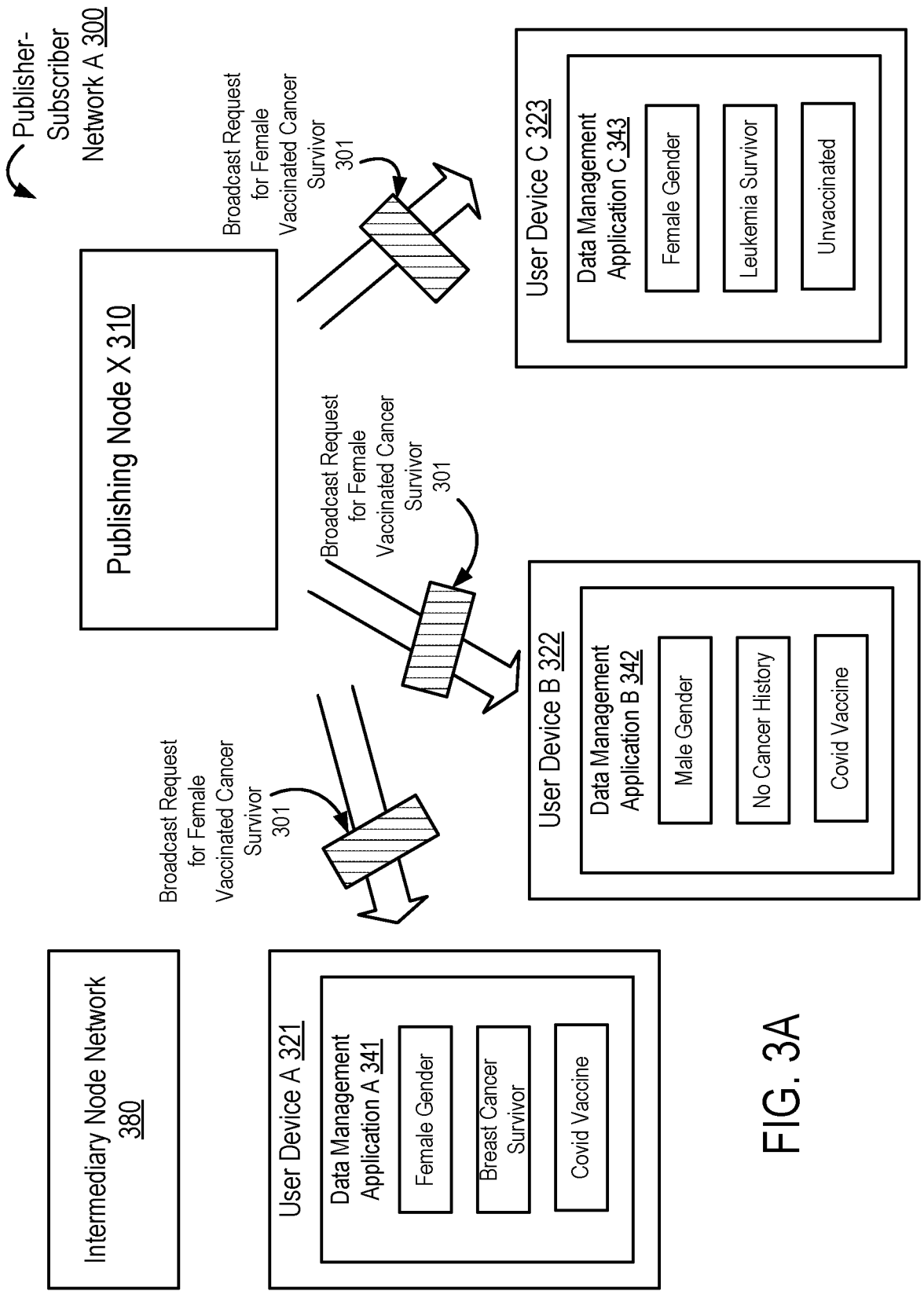
FIGS. 3A and 3B show systems in accordance with one or more embodiments.

Turning to FIG. 3A, FIG. 3A shows a system in accordance with one or more embodiments. As shown in FIG. 3A, a publisher-subscriber network A (300) may include one or more publishing nodes (e.g., publishing node X (310)) and one or more subscriber nodes (e.g., user device A (321), user device B (322), and user device C (323)). For example, a user device in the publisher-subscriber network may include a data management application (e.g., data management application A (341), data management application B (342), data management application C (343)) that may be similar to the user's data management application N (111) described above in FIG. 1A. Likewise, a publisher-subscriber network may also include one or more intermediary nodes (such as one or more nodes that implement one or more distributed ledger technologies, such as intermediary node network (380)). In some embodiments, nodes in the publisher-subscriber network may have subscriber functionality and publisher functionality. For example, a user device A may be a recipient of request for data in some situations, while may also be the requester of information from other user devices in other situations.

Keeping with FIG. 3A, publisher-subscriber network A (300) illustrates an example where publishing node X (310) transmits a broadcast request (301) for information to various subscriber nodes in the network (e.g., user device A (321), user device B (322), user device C (323)). More specifically, the broadcast request (301) includes one or more data requests regarding a female person who has been vaccinated and is also a cancer survivor. Similar data requests are transmitted to user device A (321), user device B (322), and user device C (323). In FIG. 3A, respective users have information associated with their respective data management applications (for example, data management application A (341) stores personal data identifying a user as a member of the female gender, a breast cancer survive, and having received a Covid vaccine). While the user data is shown in FIG. 3A being associated with various data management applications, in some embodiments, the user data is stored outside the respective user devices (e.g., some data may be distributed between one or more intermediary nodes).

Figure 3B:
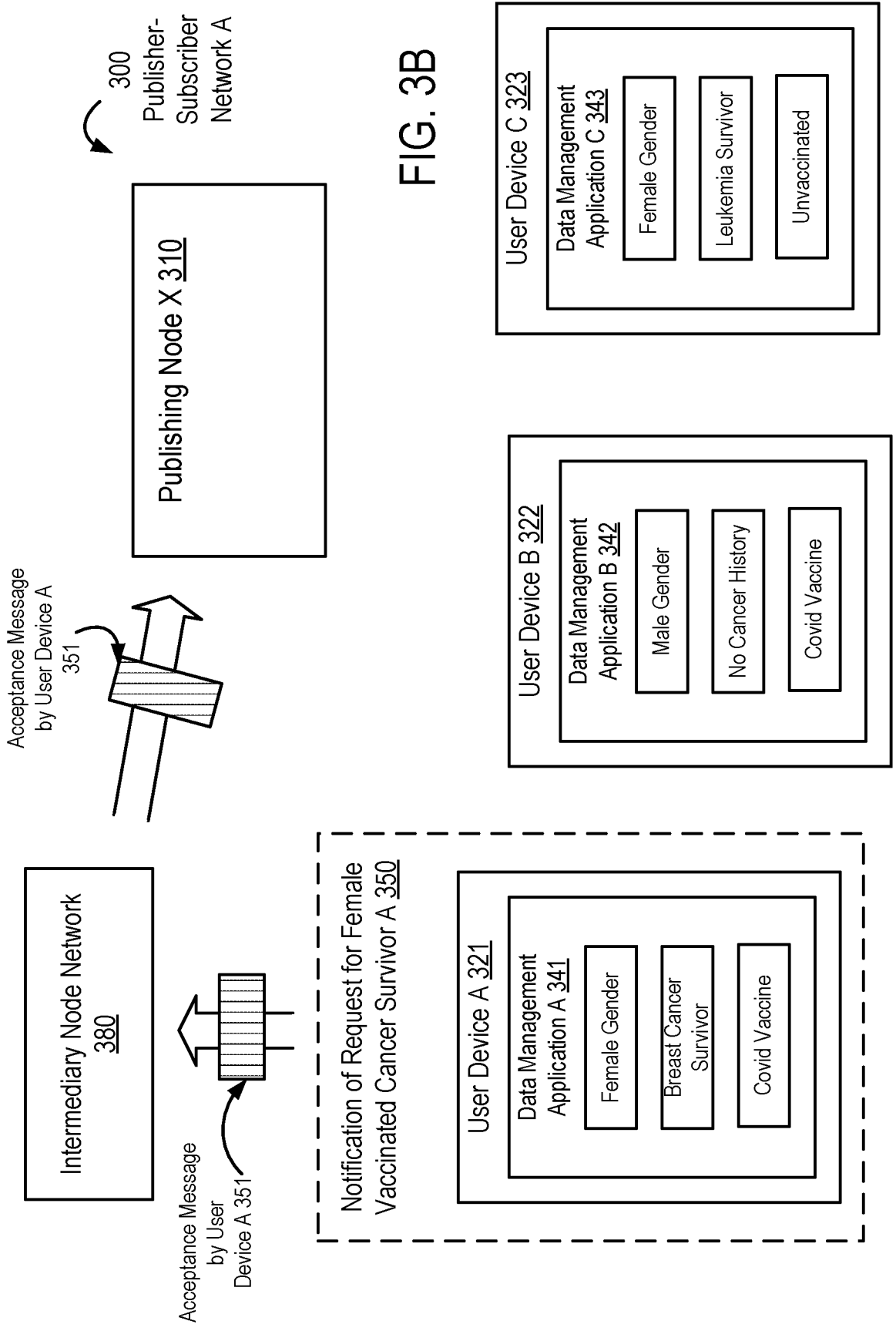

Turning to FIG. 3B, a data management application A (341) determines that a user's data correspond to the broadcast request (301) for a female vaccinated cancer survivor. On the other hand, data management applications in user device B (322) and user device C (323) ignore the request, because their local personal data did not match the data variables in the broadcast request. Accordingly, the data management application A (341) transmits an acceptance message (351) to the publishing node X (310), e.g., to provide further user data or to agree to one or more transactions associated with the request. In some embodiments, a user confirms whether to respond to the broadcast request (301), e.g., in response to a prompt on a display device in a user device (e.g., notification of request for female vaccinated cancer survivor A (350)).

In some embodiments, for example, a user may be driving in an automobile when various nodes along the user's itinerary may be broadcasting advertisements to nearby user devices. Rather than having a centralized server make the decision regarding which advertisements are presented on a user device, a data management application may receive each broadcast request and process it according to a user's personal data or selected preferences. In particular, a user's data management application may filter broadcast requests based on personal data within the data management application. If a user enjoys seafood and dislikes pizza, the user's data management application may ignore any broadcast requests from pizza restaurants, while displaying advertisements for seafood restaurants on the user device.

In some embodiments, for example, a pharmaceutical company may want to research side effects of a drug X on female patients under 25 years of age who had breast cancer. Even if such database of patients exists, privacy laws and regulations may prevent performance of data collection and data processing operations because of compliance problems (e.g., accessing patient data may require contact to an ethics committee etc.). Where a patient would love to contribute to the data collection, the patient may lack the opportunity due to being unaware of the research offer. Thus, data management application may provide a decentralized system that overcomes various privacy laws and regulations preventing such transactions. For example, a pharmaceutical node may publish a binding offer in data management application broadcast. Such requests may be sent out over an IPFS network, and each data management application may use rules defined in one or more smart contracts to determine whether a data management application should consider the offer. For example, where an offer is meant for females under 25 years of age and a data management application's user is outside the desired group, then a smart contract may ignore the offer without providing any feedback to the user or the pharmaceutical publishing node. In case a user profile does match specific requirements of an offer, a smart contract may consult user defined rules. For example, a user may consider only offers from companies with good reputation based on one or more metrics. When such rules match a user's preferences or terms of one or more smart contracts in one or more distributed ledgers, an offer may be presented to the user on the user device.

Depending on offer types, a data request for information or a data transaction may be presented as a push notification on the user device or end up in a digital mailbox with hundreds of other offers. In response to the data request, a user may accept the respective contract or simply ignore the offer. Thus, in this example, a pharmaceutical company may receive desired personal information within minutes of broadcasting a request over a publisher-subscriber network along with signed contracts permitting the company to proceed with processing the personal information. For example, users with specific medical conditions may benefit from cooperation with exceptionally skilled science community and possibly earn extra rewards as drug discounts or cash payouts.

In some embodiments, a publisher-subscriber network provides a universal offer marketplace. For example, a central data "marketplace" may be established where organizations can broadcast "offers" based on queries meant to be executed on user data (e.g., the query {age<25, gender=M, location='Dubai' }). Some examples of these offers may relate to products, services, job descriptions, research studies, etc. These offers may be transmitted periodically by nodes on a network, and the associated queries may be executed against user data after secure decryption on the background, all within the trusted walled environment. If the conditions of this query are fully met, an offer may be made available to the user in his data management application. If the conditions are not met, an offer may be dropped. Thus, organizations may not know who their offer was presented to, but may only be capable of accessing aggregated data (e.g., statistics) like the number of users that accepted the offer. Users may be able to opt-out of various types of offers, for example. Some features of this decentralized system may include: standardization and non-redundancy of the data fields that a user will store and which queries can be used, interoperability (e.g., "age" should be present once and only once in the data, and all queries should use this value if they require age information). Some embodiments may have an efficient mechanism for processing offers on the background so that one query does not consume too much of a data management application's resources, and offers don't start to incrementally queue. Likewise, a cache may be implemented in each user's data management application in order to easily access and decrypt frequently used data and not having to download it from the distributed network each time. The data management application may also store metadata of the user's data, in order to efficiently find and process the data.

Figure 4:
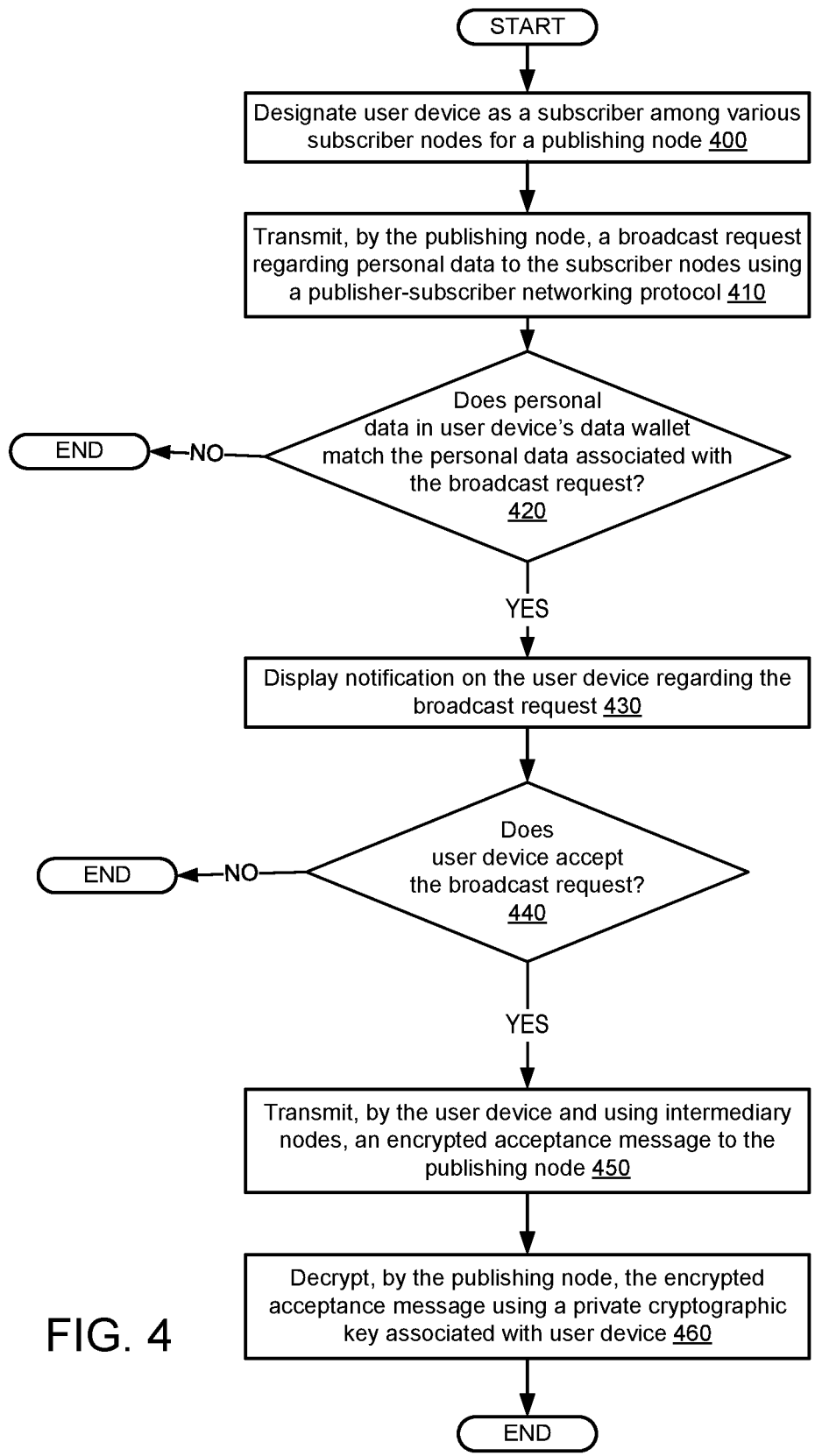
FIG. 4 shows a flowchart in accordance with one or more embodiments.

Turning to FIG. 4, FIG. 4 shows a flowchart in accordance with one or more embodiments. Specifically, FIG. 4 describes a general method for operating a data marketplace in accordance with one or more embodiments. One or more blocks in FIG. 4 may be performed by one or more components (e.g., publisher-subscriber network A (300)) as described in FIGS. 1A, 1B, 3A, and 3B. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a user device is designated as a subscriber node among various subscriber nodes for a publishing node in accordance with one or more embodiments.

In Block 410, a broadcast request is transmitted by a publishing node regarding personal data to various subscriber nodes using a publisher-subscriber networking protocol in accordance with one or more embodiments.

In some embodiments, Blocks 400 and 410 may be performed in a different order, for example. Broadcasting can be made also in opposite order. In a bulletin board analogy, publishing may be performed for some advertisement even when there are no subscribers. However, a person may walk past the bulletin board to read the message. Thus, a broadcast request may be periodically transmitted such that some subscriber nodes may obtain the broadcast request at a later date after the initial broadcast request. Thus, in some embodiment, subscriber nodes may be added and/or removed from a publisher-subscriber network.

In Block 420, a determination is made whether personal data in user device's data management application matches personal data associated with a broadcast request in accordance with one or more embodiments.

In Block 430, a notification on a user device is displayed regarding a broadcast request in accordance with one or more embodiments. Block 430 may be optional. For example, a user may have predefined responses to some data requests that may omit a notification. As an example, a user may not mind if a publisher requests birthday information, and may automatically provide it when requested.

In Block 440, a determination is made whether a user device accepts a broadcast request in accordance with one or more embodiments.

In Block 450, an encrypted acceptance message is transmitted to a publishing node by a user device in accordance with one or more embodiments. In some embodiments, for example, one or more intermediary nodes are used to transmit the acceptance message. In some embodiments, other communication methods are used to exchange data, such as near-field communication techniques (e.g., Bluetooth). Thus, user data may be transmitted directly peer to peer without intermediary nodes.

In Block 460, an encrypted acceptance message is decrypted by a publishing node using a private cryptographic key associated with a user device in accordance with one or more embodiments.

Decentralized Identities and Decentralized Applications

In some embodiments, a data management application uses a decentralized identity to verify and authenticate user data. For example, a decentralized identity system may be based on a decentralized identity standard. The decentralized identity may allow users to control a decentralized identity through an interface that allows users to securely generate key pairs which are linked to a decentralized system, such as using distributed ledger technology. A decentralized identity may use a decentralized identifier (DID) that is a type of identifier that enable a verifiable, decentralized digital identity, e.g., for use with decentralized web applications. A decentralized identity may perform one or more of the following functions: (1) authenticate into third-party applications that support the decentralized identity system; (2) allow authorized entities to sign and write on one's personal datastore; and (3) prove information regarding a user's identity using signed data by the decentralized identity system.

In some embodiments, a decentralized identity system may rely on storing encrypted personal information linked to a user's identity in a distributed storage system and use one or more APIs to interact with the data in the distributed storage system. In some embodiments, a decentralized identity may be a globally unique identifier linked to a decentralized public key infrastructure (DPKI) metadata that include public key material, authentication descriptors, and service endpoints. In some embodiments, DID user agents are used that are applications that enable real people to use decentralized identities. A user agent application may aid in creating DIDs, managing data and permissions, and signing/validating DID-linked information. In some embodiments, a decentralized identity system includes a DID universal resolver that is server that uses a collection of DID drivers to provide a standard means of lookup and resolution for DIDs across implementations and decentralized systems and that returns the DID Document Object (DDO) that encapsulates DPKI metadata associated with a particular DID. In some embodiments, a decentralized identity system includes a DID Identity Hubs, which may be a replicated mesh of encrypted personal datastores, composed of cloud and edge instances.

In some embodiments, a user's data management application is a decentralized application (DApp). For example, a DApp may have backend code running on decentralized servers connected to a peer-to-peer network. With frontend code, the code may be stored on decentralized storage like IPFS. In contrast to a DApp, a centralized application may include software or an application module that operates at a single center or a single server and is responsible for all actions and data storage. In some embodiments, a user's data management application is a distributed application, where processing is shared via multiple nodes, but where decision making may be centralized.

In some embodiments, a decentralized system uses an InterPlanetary File System (IPFS) protocol with a peer-to-peer network for storing and sharing data in a distributed storage system. For example, IPFS may use content-addressing to uniquely identify each file in a global namespace connecting various nodes. Thus, an IPFS may be built around decentralized system nodes that hold a portion of the overall data, thereby providing file storage and sharing functionality. Any user in the network may serve a file by its content address, and other peers in the network may find and request content from other nodes (e.g., other nodes with its distributed hash table (DHT)). Thus, a distributed storage system may include infrastructure that can split data across multiple physical nodes (e.g., even different nodes with a data warehouse).

Encryption and Decryption Technology

Turning to various encryption/decryption technologies, one technology is split-key encryption. In particular, split-key encryption may be a process where a private key is divided into parts and encrypted at different locations to avoid the private key from being reconstructed. Thus, the private key may be secure even where one part of the private key is intercepted and analyzed. For example, splitting of encryption keys may protect passwords and provide a passwordless authentication experience. From a user perspective, a password may not be entered by the user into a device. In the background, an encryption system may transmit requests to match of key segments (e.g., parts of a password) stored at different locations to reconstruct a user credential, and the user's session is authenticated.

Turning to threshold cryptography, an encryption system may protect information by encrypting data and distributing the encrypted data among a cluster of nodes. The encrypted data may be encrypted using a public key, and the corresponding private key may be shared among the participating nodes. In order to decrypt an encrypted message or to sign a message, several parties (more than a predetermined threshold number) must cooperate in the decryption or signature protocol.

Turning to functional encryption techniques, some embodiments use one or more functional encryption schemes in connection with a data management application and/or data marketplace implementation. In a functional encryption scheme, a master secret key may be generated, e.g., by a central authority, along with multiple functional decryption keys or evaluation keys. Where a master secret key decrypts an entire message, an evaluation key may perform a predetermined operation on encrypted data that results in an unencrypted output. Evaluation keys may be derived from the master secret key or independently, and may obtain a result equivalent to applying the predetermined operation to underlying data in clear text. An example of a predetermined operation may be a mathematical operation, such as additive operation or a subtractive operation, as well as a logical operation such as a Boolean operation. For illustration, if data associated with variable a and variable b are encrypted using a public key, an evaluation key may perform an additive operation that provides the mathematical result in plaintext of adding variable a and variable b (i.e., a+b). Examples of functional cryptography schemes include Inner Product Functional Encryption (IPFE) schemes, Attributed-based encryption (ABE) schemes, and identity-based encryption schemes. In an IPFE scheme, a plaintext of a message may be organized as a vector and the encrypted data is used along with an evaluation key to compute an inner product of the vector and another vector. IPFE schemes may be multi-client schemes, multi-input schemes, and/or decentralized function hiding schemes. An ABE scheme may link encrypted data with various attributes and cryptographic keys and/or policies that manage decryption based on specific attributes. Identity-based encryption schemes may associate ciphertexts and private keys with strings such that a cryptographic key may decrypt a ciphertext if the two strings are equal.

Turning to homomorphic encryption schemes, a homomorphic encryption scheme may allow performance of an operation on encrypted data that results in an encrypted output. For example, a computation using homomorphic encryption may remain in encrypted form in order to be decrypted at a later point using a secret key. Examples of homomorphic encryption may include partially homomorphic encryption (e.g., keeps sensitive data secure by only predetermined operations to be performed on the encrypted data), somewhat homomorphic encryption (e.g., supports limited operations that can be performed only a set number of times), and fully homomorphic encryption.

Distributed Ledger Technology

In some embodiments, intermediary nodes are implemented using one or more types of distributed ledger technology. Examples of distributed ledger technology may include blockchains, hashgraphs, directed acyclic graphs, and various hybrid implementations of different distributed ledger technologies. In particular, a distributed ledger may be implemented using multiple nodes over a network, where an intermediary node protocol may determine which entities (e.g., any person or only approved entities) can operate nodes to validate transactions. Different distributed ledger technologies may also vary used different consensus algorithms, such as a proof of work, a proof of stake, a voting system, and/or hashgraphs. Thus, a distributed ledger technology may ensure that changes to a particular ledger are reflected throughout an intermediary node network, (e.g., all network members may have a matching copy of the whole ledger at any specific instance). Furthermore, a distributed ledger system may provide the ability for storing, recording, and exchanging of digital information across different, consenting parties without the need for a centralized authority or record-keeper.

In some embodiments, an intermediary node network may use a permissioned or a permissionless protocol. A permissioned protocol may use a form of permission among nodes for a central entity to access the intermediary node network, such as for modifying the distributed ledger. On the other hand, in the case of permissionless distributed ledgers, every node in an intermediary node network may access a full and updated copy of the entire ledger. In a hybrid distributed ledger technology (DLT), an intermediary node protocol may use features based on both permissionless and permissioned protocols.

Turning to hashgraph technology, a hashgraph may store multiple transactions on a distributed ledger using timestamps. A hashgraph record in a distributed ledger may be referred to as an "event", and transactions are stored in a parallel structure. The hashgraph system may ensures that no nodes on the intermediary node network may modify transaction information. Turning to directed acyclic graphs (DAGs), a DAG uses a consensus mechanism, where every node on the network provides a proof of transactions on the ledger and may initiate transactions. To initiate a transaction, a node has to verify at least two previous transactions on the ledger to confirm their new transaction.

Turning to blockchain technology, a blockchain network may be a peer-to-peer network that adheres to protocols for inter-node communication and validation of new blocks. For example, a blockchain network may allow two or more participants unknown to each other to perform transactions accordingly. In particular, blocks within a blockchain may be encrypted and protected by a hash function. When a new blockchain is being mined, a blockchain may be synchronized with other nodes in the blockchain network. By being decentralized, compromising the blockchain may requires cooperation with a majority of the blockchain nodes, thereby reducing the chance for fraudulent transactions. Transactions on a blockchain may transfer information between various public keys. Some blockchain technologies may implement a public blockchain network or a private blockchain network. A public blockchain network may not store information in a single place, but distributes stored information across a peer-to-peer network. The public blockchain network may then use a verification mechanism to determine the authenticity of data. For example, a consensus method may be used where blockchain nodes reach an agreement on a current state of the distributed ledger. Examples of consensus methods include a proof of work (PoW) mechanism and a proof of stake (PoS) mechanism. Turning to private blockchain networks, a private blockchain network may implement a closed network that is under the control of one or more entities. For example, a private blockchain network may operates similar to a public blockchain network (e.g., using peer-to-peer connections and decentralized storage). However, the private blockchain network may limit which nodes may join the network. Thus, a private blockchain network may use a permissioned protocol for adding new nodes accordingly.

Furthermore, a hybrid blockchain technology may combine elements of both private and public blockchain network. For example, a hybrid blockchain network may have a private, permission-based system alongside a public permissionless system. For example, a hybrid blockchain network may include functionality for controlling which data is only accessible to specific users in the blockchain, and which data is publically available. For example, transactions and records in a hybrid blockchain may not be made public but may be verified when requested, such as by allowing access through a smart contract. Confidential information may be kept inside the network while still allowing verification of the confidential information. Likewise, a hybrid blockchain technology may also prevent a private entity that owns the hybrid blockchain network from altering transactions.

Another blockchain technology is consortium blockchains (also called "federated blockchains"). A consortium blockchain is similar to a hybrid blockchain that has private and public blockchain features. However, members from multiple entities may collaborate on an intermediary network. Thus, a consortium blockchain may be a private blockchain with limited access to different groups, e.g., to avoid a single entity from exerting control over the private blockchain network. For example, consensus procedures may be controlled by preset nodes, such as a validator node and member nodes. The validator node may initiate, receive and validate transactions, while member nodes may receive or initiate transactions.

In some embodiments, a distributed ledger technology includes a mainchain for implementing the distributed ledger. However, some embodiments are contemplated that use a separate chain for each application, where individual chains may validate respective transactions on the mainchain after a particular epoch time/number of transactions.

Computer System

Figure 5A:
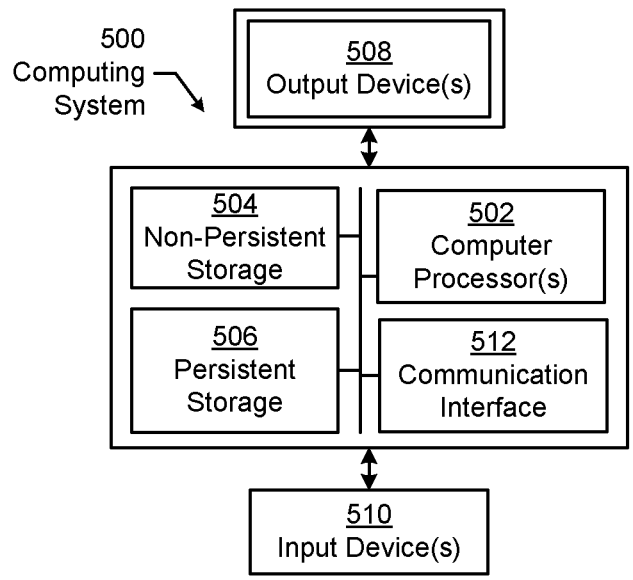
FIGS. 5A and 5B show a computing system in accordance with one or more embodiments.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
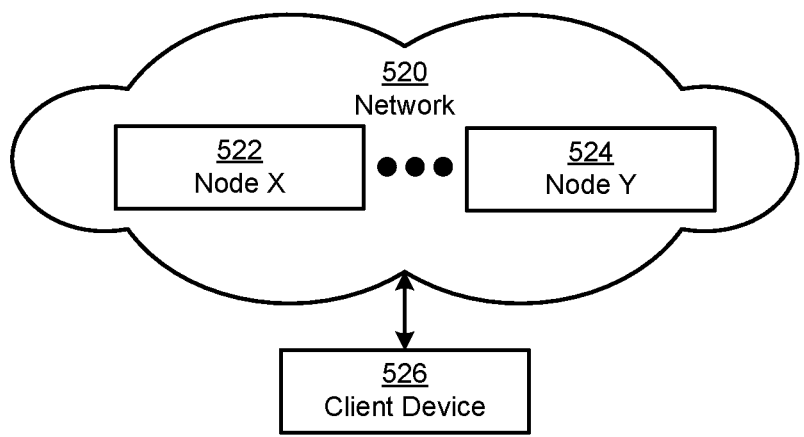

The computing system (500) in FIG. 5A may be connected to or be a part of a computer network. For example, as shown in FIG. 5B, the computer network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the computer network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the disclosure.

The computing system or group of computing systems described in FIGS. 5A and 5B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

Once data is obtained, such as by using techniques described above or from storage, the computing system, in performing one or more embodiments of the disclosure, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the disclosure.

While the technology has been described with respect to a limited number of embodiments, those skilled in the art, having benefit of this disclosure, will appreciate that other embodiments can be devised which do not depart from the scope of the technology as disclosed herein.

What is claimed is:

1. A system, comprising:
a plurality of user devices comprising a first user device, wherein the first user device comprises a first hardware processor, a first cryptographic key, and first personal data associated with a first user and a first data variable;
a node coupled to the plurality of user devices and comprising a second hardware processor; and
a plurality of intermediary nodes coupled to the plurality of user devices and the node, the plurality of intermediary nodes implementing a distributed ledger,
wherein the node is configured to transmit a broadcast request to the plurality of user devices, the broadcast request comprising a first data request associated with the first data variable,
wherein the first user device is configured to transmit, in response to receiving the broadcast request, encrypted data to the plurality of intermediary nodes based on the first personal data and the first cryptographic key, and
wherein the plurality of intermediary nodes are configured to transmit the encrypted data to the node using the distributed ledger.

2. The system of claim 1, further comprising:
a second user device coupled to the plurality of intermediary nodes and comprising a data management application,
wherein the data management application is configured to:
store second personal data associated with a second data variable and a predefined response associated with the second data variable, and
transmit the second personal data to the plurality of intermediary nodes automatically in response to a second data request associated with the second data variable and based on the predefined response.

3. The system of claim 1, further comprising:
a second user device coupled to the plurality of intermediary nodes and comprising a data management application,
wherein the data management application is configured to:
store second personal data and a plurality of predefined responses associated with a plurality of data variables,
obtain a second data request for a second data variable,
determine whether the second data request corresponds to the second data variable that matches at least one data variable associated with at least one predefined response among the plurality of predefined responses, and
present, in response to the second data request failing to match the at least one data variable, a notification on a display device requesting authorization to transmit the second personal data.

4. The system of claim 1, further comprising:
a publisher-subscriber network comprising the plurality of user devices and the node,
wherein the plurality of user devices are subscriber nodes within the publisher-subscriber network,
wherein the node is a publishing node within the publisher-subscriber network, and wherein the node is configured to use a publisher-subscriber network protocol to transmit one or more broadcast requests over the publisher-subscriber network.

5. The system of claim 1,
wherein the plurality of intermediary nodes are a plurality of blockchain nodes,
wherein the plurality of blockchain nodes are configured to validate a plurality of data transactions comprising a first data transaction and a second data transaction,
wherein the first data transaction corresponds to the first user device transmitting the encrypted data to the plurality of blockchain nodes, and
wherein the second data transaction corresponds to the plurality of blockchain nodes transmitting the encrypted data to the node.

6. The system of claim 1,
wherein the distributed ledger comprises a smart contract,
wherein a respective intermediary node among the plurality of intermediary nodes is configured to execute the smart contract in response to receiving the encrypted data, and
wherein the respective intermediary node is further configured to relay the encrypted data to the node based on a location address that is stored in the smart contract.

7. The system of claim 1,
wherein the distributed ledger is selected from a group consisting of a private blockchain, a public blockchain, a hybrid blockchain, a hashgraph, and a directed acyclic graph.

8. The system of claim 1,
wherein the first data variable is selected from a group consisting of a gender, a sexual orientation, an ethnic origin, and a political affiliation.

9. A method, comprising:
transmitting, by a node comprising a hardware processor, a broadcast request to a plurality of user devices on a publisher-subscriber network, wherein the broadcast request comprises a data request regarding a data variable;
obtaining, by the node and in response to the broadcast request, personal data from a plurality of intermediary nodes coupled to the publisher-subscriber network,
wherein the node is a publishing node and the plurality of user devices are subscriber nodes,
wherein the plurality of intermediary nodes implement a distributed ledger, and
wherein the plurality of intermediary nodes transmit the personal data to the node in response to the plurality of intermediary nodes validating a data transaction associated with the personal data using the distributed ledger.

10. The method of claim 9, further comprising:
decrypting encrypted data using a public cryptographic key to produce decrypted data,
wherein the decrypted data corresponds to the personal data that is obtained by the node.

11. The method of claim 9,
wherein the distributed ledger comprises a smart contract,
wherein a respective intermediary node among the plurality of intermediary nodes is configured to execute the smart contract in response to receiving the personal data, and
wherein the respective intermediary node is further configured to relay the personal data to the node based on a network location address that is stored in the smart contract.

12. The method of claim 9,
wherein the distributed ledger is selected from a group consisting of a private blockchain, a public blockchain, a hybrid blockchain, a hashgraph, and a directed acyclic graph.

13. The method of claim 9,
wherein the data transaction is validated by determining whether a requesting application on the node is authorized to receive the personal data from the plurality of intermediary nodes.

14. The method of claim 9,
wherein the node is a user device.

* * * * *